(12) United States Patent
Bell et al.

(10) Patent No.: US 11,561,624 B2
(45) Date of Patent: Jan. 24, 2023

(54) CAPACITIVE TOUCH ENABLED KEY WITH A CORRESPONDING TACTILE BUTTON

(71) Applicant: NVIDIA Corporation, Santa Clara, CA (US)

(72) Inventors: Andrew Bell, San Francisco, CA (US);
Jing Kathleen Jen, San Jose, CA (US);
Younseok Sung, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 34 days.

(21) Appl. No.: 16/777,703

(22) Filed: Jan. 30, 2020

(65) Prior Publication Data

US 2020/0249766 A1 Aug. 6, 2020

Related U.S. Application Data

(60) Provisional application No. 62/800,204, filed on Feb. 1, 2019.

(51) Int. Cl.
*G06F 3/02* (2006.01)
*G06F 3/044* (2006.01)

(52) U.S. Cl.
CPC .............. *G06F 3/021* (2013.01); *G06F 3/044* (2013.01)

(58) Field of Classification Search
CPC ....................................................... G06F 3/044
See application file for complete search history.

(56) References Cited

U.S. PATENT DOCUMENTS

| | | | | | |
|---|---|---|---|---|---|
| 4,794,366 | A | * | 12/1988 | Sakamoto | ................. G01L 1/20 29/620 |
| 2003/0058223 | A1 | * | 3/2003 | Tracy | ................. H01H 13/7006 345/169 |
| 2014/0267043 | A1 | * | 9/2014 | Kaiser | ................. G06F 3/04883 345/168 |
| 2018/0083620 | A1 | * | 3/2018 | Bushnell | ............ H03K 17/9618 |

* cited by examiner

*Primary Examiner* — Gustavo Polo
(74) *Attorney, Agent, or Firm* — Zilka-Kotab, P.C.

(57) ABSTRACT

For mechanical keyboards or other input devices with individual mechanical key buttons, and particularly for compact keyboards used for laptops and other such devices, the size of the up and down arrow keys is usually half the size of most other keys on the keyboard. For example, each letter key on a physical keyboard is typically double the size of each of the up and down arrow keys on that same keyboard. Due to the smaller physical size of the up and down arrow keys, a modified mechanical configuration is used which results in a variation in the tactile feel of the various buttons of the keyboard for a user. The present disclosure discloses a capacitive touch enabled key with a corresponding tactile button to allow the key to represent multiple different inputs while also maintaining a same tactile response as other single input keys of the input device.

21 Claims, 9 Drawing Sheets

US 11,561,624 B2

CAPACITIVE TOUCH ENABLED KEY WITH A CORRESPONDING TACTILE BUTTON

CLAIM OF PRIORITY

This application claims the benefit of U.S. Provisional Application No. 62/800,204 titled "CAPACITIVE TOUCH ENABLED ARROW KEYS WITH A SINGLE TACTILE BUTTON," filed Feb. 1, 2019, the entire contents of which is incorporated herein by reference.

TECHNICAL FIELD

The present disclosure relates to mechanical keys on an input device.

BACKGROUND

For mechanical keyboards with mechanical buttons, and particularly for compact keyboards used for laptops and other such devices, the size of the up and down arrow keys is usually half the size of most other keys on the keyboard. For example, each letter key on a physical keyboard is typically double the size of each of the up and down arrow keys on that same keyboard. Due to the smaller physical size of the up and down arrow keys, a modified version of a tactile button is used for those up and down arrow keys. For example, while the standard sized keys (e.g. letter keys) are implemented using a metal dome button, the up and down arrow keys are typically implemented using a rubber dome button. The same may be said for any buttons on a keyboard or other input device that are smaller in size than the standard sized keys. However, configuring a keyboard to have different types of tactile buttons results in a variation in the tactile feel of the keyboard for a user.

There is a need for addressing these issues and/or other issues associated with the prior art.

SUMMARY

A mechanical key for an input device is disclosed. In one embodiment, the mechanical key is a capacitive touch enabled key with a corresponding tactile button. The mechanical key includes a key cap having a capacitive touch sensor coupled thereto. In addition, the mechanical key includes a tactile button to register a press of the key cap by a user.

DETAILED DESCRIPTION

Figure 1:
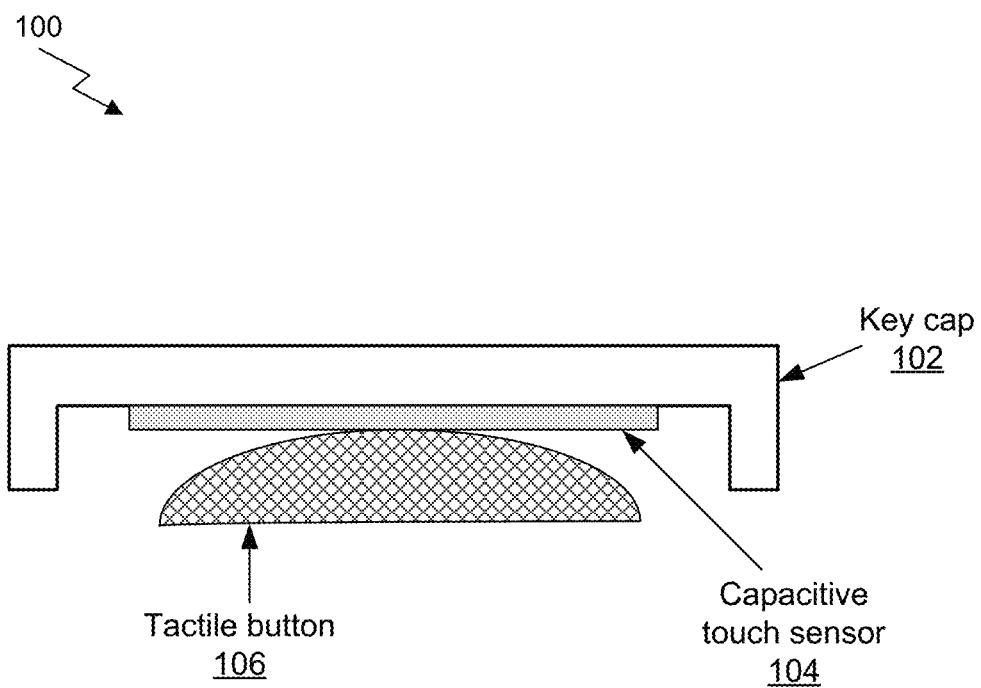
FIG. 1 illustrates a cross-section view of a capacitive touch enabled mechanical key having a corresponding tactile button, in accordance with an embodiment.

FIG. 1 illustrates a cross-section view of a capacitive touch enabled mechanical key 100 having a corresponding tactile button, in accordance with an embodiment. In one embodiment, the mechanical key may be configured for use on a mechanical keyboard or other input device (e.g. game controller, television controller, personal device controller, etc.). Examples of this embodiment will be described in more detail below with reference to the additional figures.

As shown, the mechanical key 100 includes a key cap 102 having a capacitive touch sensor 104 coupled thereto. The key cap 102 may refer to any outer physical structure or layer of the mechanical key 100. To this end, the key cap 102 may be a portion of the mechanical key 100 that is intended to be pressed by a user.

The capacitive touch sensor 104 that is coupled to the key cap 102 refers to a hardware device that detects touch of the key cap by the user. Unlike a simple physical button requiring sufficient force to depress the button, for example, the capacitive touch sensor is more sensitive, and may be able to respond differently depending on the portion of the touch sensor that is touched and/or differently for different kinds of touch, such as tapping, swiping, etc. Each user touch that the capacitive touch sensor 104 detects results in a signal being sent to a processing unit and/or software that processes the signal to determine the intended input of the user and to respond accordingly.

Generally, the capacitive touch sensor 104 includes a sensor electrode that is connected to a measurement circuit where the capacitance is measured (e.g. periodically). The output capacitance will increase if a conductive object (e.g. user's finger) touches or approaches the sensor electrode. The measurement circuit will detect the change in the capacitance and convert it into the aforementioned signal.

In one embodiment, at least a portion of the capacitive touch sensor 104 may be in direct contact with the key cap 102. In another embodiment, at least a portion of the capacitive touch sensor 104 may be coupled to the key cap 102 using an adhesive layer therebetween. Of course, other methods of coupling the capacitive touch sensor 104 and the key cap 102 may be used, some of which are described in more detail below with reference to the remaining figures.

As also shown, the mechanical key 100 includes a tactile button 106 to register a press of the key cap 102 by the user. The tactile button 106 may be configured to allow the mechanical key 100 to be physically depressed, to some extent, by the user. For example, the tactile button 106 may include a metal dome, rubber dome, or dome of another material, in various embodiments. In any case, the tactile button 106 may be the same mechanism as configured for other mechanical keys configured for a mechanical keyboard or other input device.

To this end, the mechanical key 100 may operate such that, responsive to the press (depression) of the key cap 102 by the user, the capacitive touch sensor 104 is operable to generate a signal indicative of the user's touch while the tactile button 106 provides a same tactile response as other input keys of the input device which may or may not have a corresponding capacitive touch sensor 104.

The configuration shown in FIG. 1 allows an embodiment where the mechanical key 100 represents a plurality of different inputs, where traditionally these different inputs may have been represented using different mechanical keys. The different inputs may include, for example, any combination of an up arrow input, a down arrow input, a left arrow input, and/or a right arrow input. In this embodiment, different portions of the key cap 102 may represent the different inputs, and when the user touches one of the portions of the key cap 102, the capacitive touch sensor 104 may detect the touch and generate a signal indicative of the corresponding input of the user. The user's touch sensed by the capacitive touch sensor 104, in combination with the depression of the mechanical key 100 as enabled by the tactile button 106, may result in the signal being provided to the above mentioned processing unit and/or software for use in determining the intended input of the user.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described. For example, while many of the embodiments described below reference a mechanical keyboard, it should be noted that the mechanical key structures described in association with those embodiments may equally apply to other types of input devices such as game controllers, television controllers, personal device controllers, etc.

Figure 2:
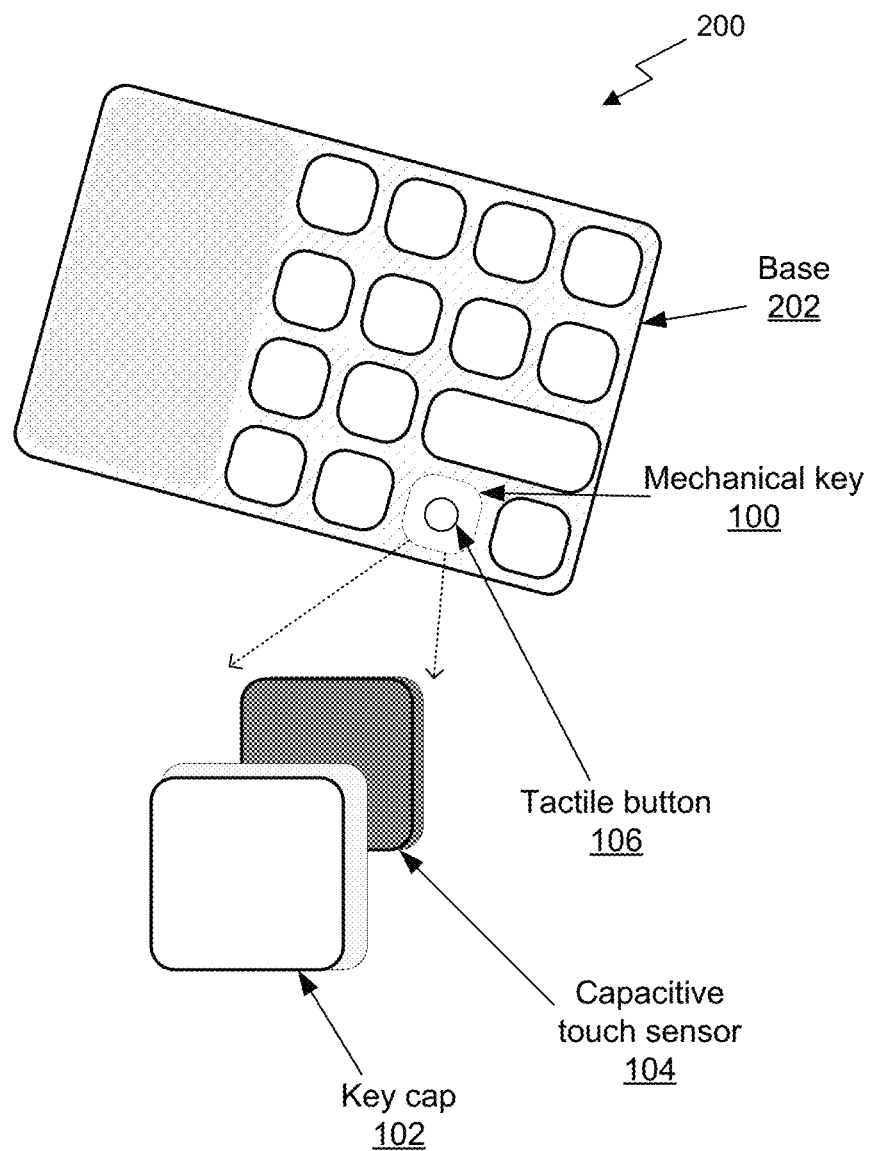
FIG. 2 illustrates an exploded view of a portion of a mechanical keyboard having the mechanical key of FIG. 1, in accordance with an embodiment.

FIG. 2 illustrates an exploded view of a portion of a mechanical keyboard 200 having the mechanical key 100 of FIG. 1, in accordance with an embodiment. It should be noted that the mechanical keyboard 200 is just one embodiment in which the mechanical key 100 of FIG. 1 may be implemented, and that other embodiments are also contemplated in which the mechanical key 100 of FIG. 1 may be implemented. The mechanical keyboard 200 may be integrated in a laptop or other computer housing, or may be wired or wirelessly connected to a tablet, personal computer, gaming console, or other computing device.

As shown, the mechanical keyboard 200 includes the mechanical key 100 of FIG. 1 along with other mechanical keys which may or may not be configured the same as the mechanical key 100. For example, the other mechanical keys may not necessarily include the capacitive touch sensor 104 of mechanical key 100 since, for example, these other mechanical keys may each only represent a single input. In this case, these other mechanical keys may simply generate a signal indicative of the corresponding single input upon a depression thereof by the user.

The mechanical keyboard 200 includes a base 202 to which the mechanical key 100 and other mechanical keys are electrically connected. The base may include electrical connections capable of providing signals received via the mechanical key 100 and other mechanical keys to a processing unit and/or software. As described with reference to FIG. 1, the mechanical key 100, as shown via the exploded view, includes the key cap 102, capacitive touch sensor 104, and tactile button 106.

Figure 3:
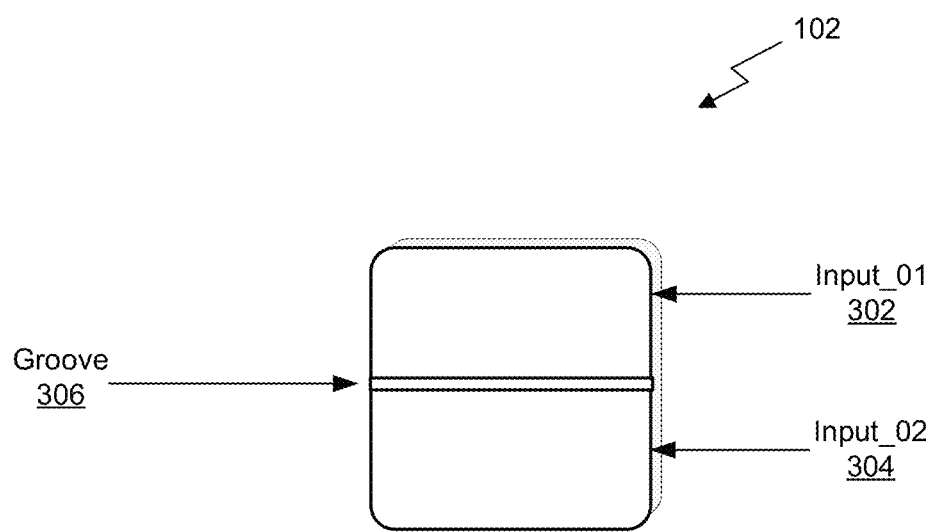
FIG. 3 illustrates the key cap of the mechanical key of FIG. 1 having a groove to indicate separate portions of the mechanical key representing different inputs, in accordance with an embodiment.

FIG. 3 illustrates the key cap 102 of the mechanical key 100 of FIG. 1 having a groove to indicate separate portions of the mechanical key 100 representing different inputs, in accordance with an embodiment. The key cap 102 shown in the present embodiment is just one example of a possible key cap that may be used for a mechanical key that represents two different inputs.

As shown, the key cap 102 is separated into two portions by a groove 306 (i.e. indention) that run horizontally across a middle of the key cap 102. The top portion represents a first input 302 (i.e. Input_01 as shown), and the bottom portion represents a second input 304 (i.e. Input_02 as shown). While the key cap 102 is shown in the present embodiment as being separated horizontally into the top/bottom portions, it should be noted that other embodiments are contemplated. For example, in a different embodiment, the key cap 102 may be separated vertically, to provide a left portion that represents one input and a right portion that represents another input. In yet another embodiment, the key cap 102 may be separated into quadrants, such that the mechanical key 100 represents four different inputs, one corresponding to each quadrant.

Figure 4:
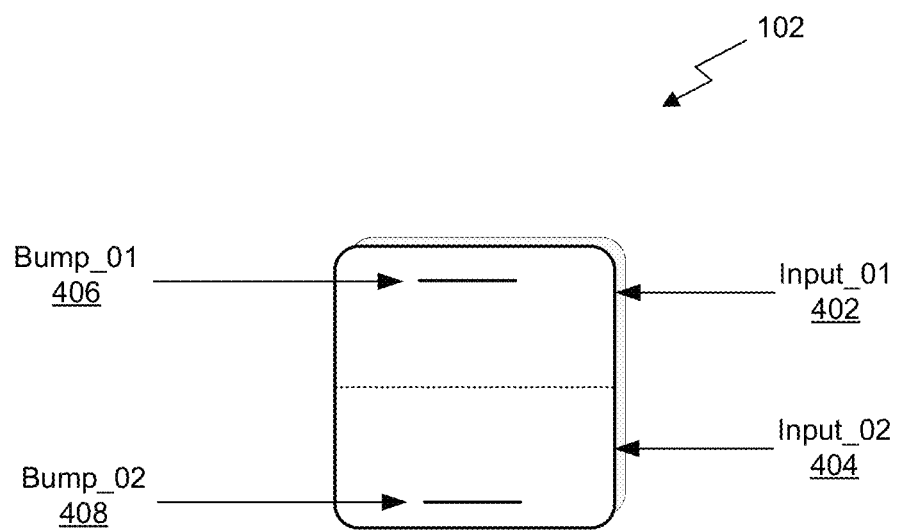
FIG. 4 illustrates the key cap of the mechanical key of FIG. 1 having bumps to indicate separate portions of the mechanical key representing different inputs, in accordance with an embodiment.

FIG. 4 illustrates the key cap 102 of the mechanical key 100 of FIG. 1 having bumps to indicate separate portions of the mechanical key 100 representing different inputs, in accordance with an embodiment. Again, the key cap 102 shown in the present embodiment is just one example of a possible key cap that may be used for a mechanical key that represents two different inputs.

As shown, the key cap 102 is visually separated into two portions with each portion being indicated by a corresponding bump 406, 408 capable of being seen and felt by the user. A top half of the key cap 102 represents a first input 402 (i.e. Input_01 as shown) and is indicated by a first bump 406 (i.e. Bump_01 as shown) located in the top portion. Similarly, a bottom portion half of the key cap 102 represents a second input 404 (i.e. Input_02 as shown) and is indicated by a second bump 408 (i.e. Bump_02 as shown) located in the bottom portion.

As described above with reference to FIG. 3, while the key cap 102 is shown in the present embodiment as being apportioned horizontally into the top/bottom portions, it should be noted that other embodiments are contemplated. For example, in a different embodiment, the key cap 102 may be apportioned vertically, to provide a left portion that represents one input and a right portion that represents another input. In yet another embodiment, the key cap 102 may be apportioned into quadrants, such that the mechanical key 100 represents four different inputs, one corresponding to each quadrant.

Figure 5:
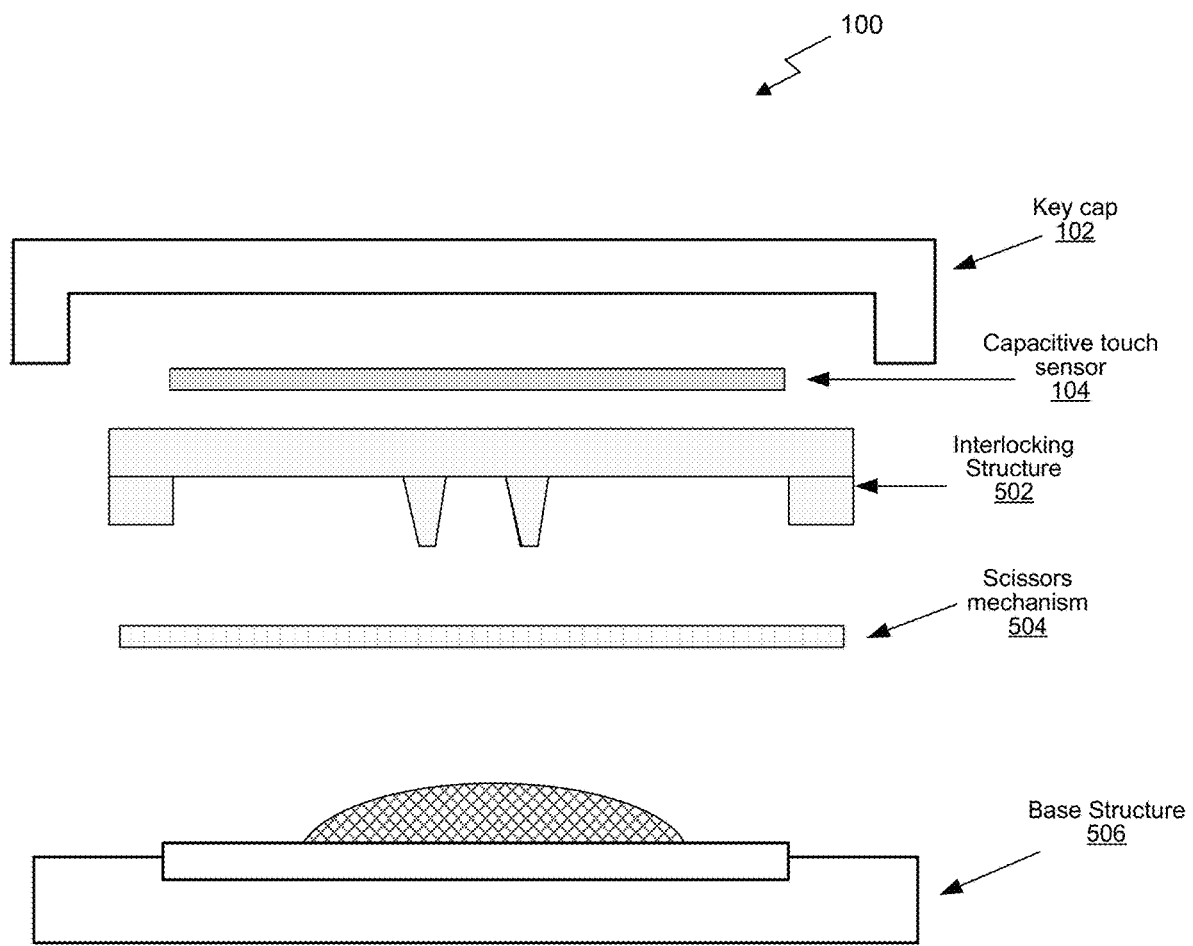
FIG. 5 illustrates an exploded view of the mechanical key of FIG. 1, in accordance with an embodiment.

FIG. 5 illustrates an exploded view of the mechanical key 100 of FIG. 1, in accordance with an embodiment. It should be noted that the components shown in the present embodiment are just one example of the configuration for the mechanical key 100 of FIG. 1.

As shown, the mechanical key 100 includes a plurality of layered components. The outer layer is the key cap 102, which is coupled to the capacitive touch sensor 104. In turn, the capacitive touch sensor 104 is coupled to a interlocking structure 502 which, in combination with a scissors mechanism 504, attaches the mechanical key 100 to the base structure 506 of the mechanical keyboard. At the base of the mechanical key 100 is the base structure 506 which includes a metal dome or other tactile button of another material that is coupled to the base of the mechanical keyboard for allowing the mechanical key 100 to be depressed by a user. The base structure 506 may also include an interlocking structure for the scissors mechanism 504, a membrane, etc.

In an alternative embodiment (not shown), the interlocking structure 502 may be directly coupled to the key cap 102 at a first surface of the interlocking structure 502, with the capacitive touch sensor 104 then coupled to the interlocking structure 502 at a second surface of the interlocking structure 502 that is opposite the first surface. In other words, the interlocking structure 502 and capacitive touch sensor 104 layers shown in FIG. 5 may be switched. In this embodiment, the interlocking structure 502 may have long enough hooks to thread through openings in the capacitive touch sensor 104 to attach to the base of the mechanical keyboard.

Figure 6:
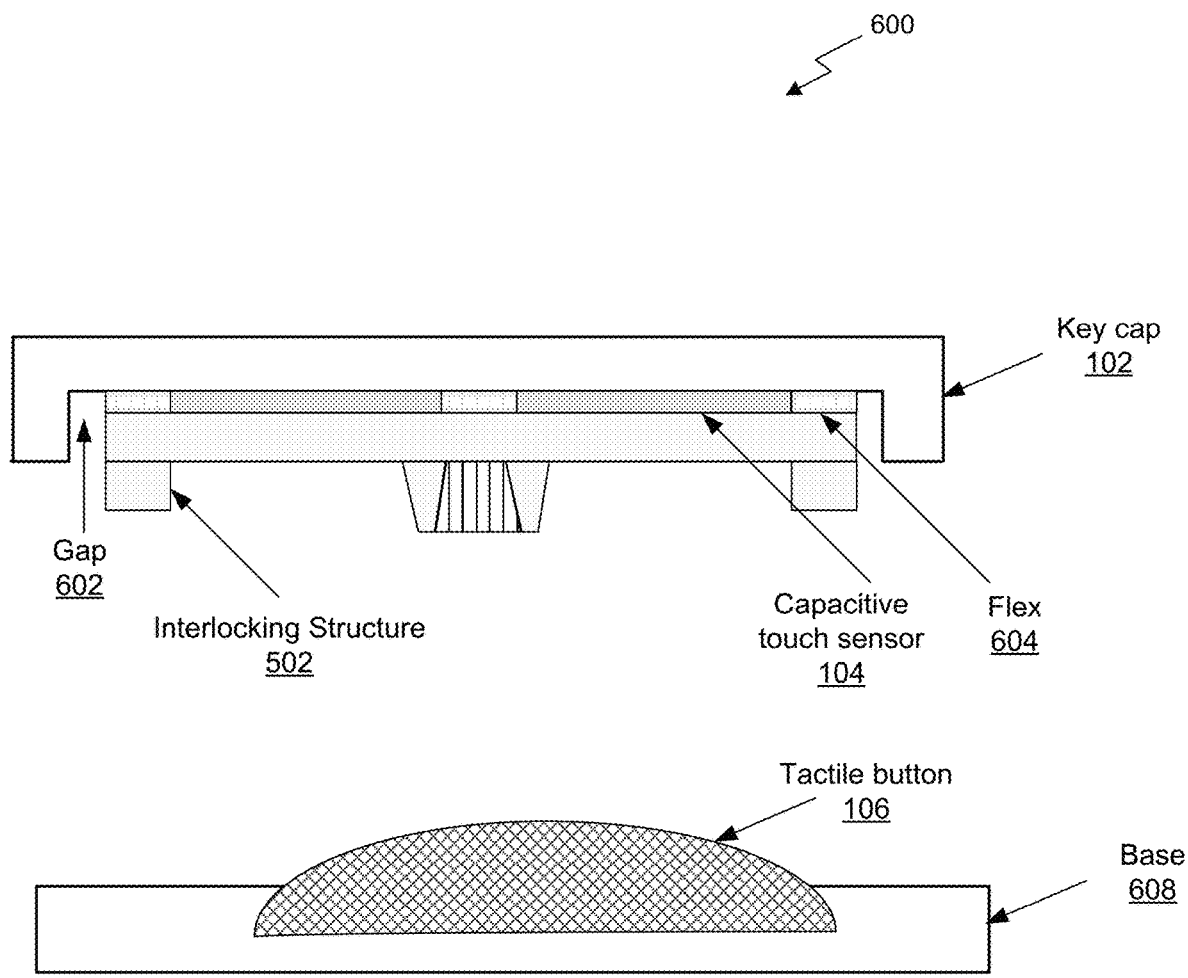
FIG. 6 illustrates an exploded cross-section view of a portion of a mechanical keyboard with a capacitive touch enabled mechanical key having a corresponding tactile button, in accordance with an embodiment.

FIG. 6 illustrates an exploded cross-section view of a portion of a mechanical keyboard 600 with a capacitive touch enabled mechanical key having a corresponding tactile button, in accordance with an embodiment. The present embodiment may be implemented, for example, in the context of any of the figures mentioned above.

As shown, the mechanical keyboard 600 includes a base 608 that is coupled to a mechanical key. The mechanical key includes all of the components shown, including the key cap 102, capacitive touch sensor 104, and the tactile button 106. In the present embodiment, the mechanical key also includes flex points 604 coupled to the key cap 102 at various positions adjacent to the capacitive touch sensor 104. Gaps 602 are provided between the vertical edges of the key cap 102 and the underlying capacitive touch sensor 104/flex points 604. Coupled to capacitive touch sensor 104/flex points 604 on a side opposed the key cap 102 is an interlocking structure 502 that attaches (hooks) the mechanical key to the base 608 of the mechanical keyboard 600. As another option (not shown), a seesaw structure may be used in place of the scissors structure to allow the interlocking structure 502 to attach the mechanical key to the base 608 of the mechanical keyboard 600.

Figure 7A:
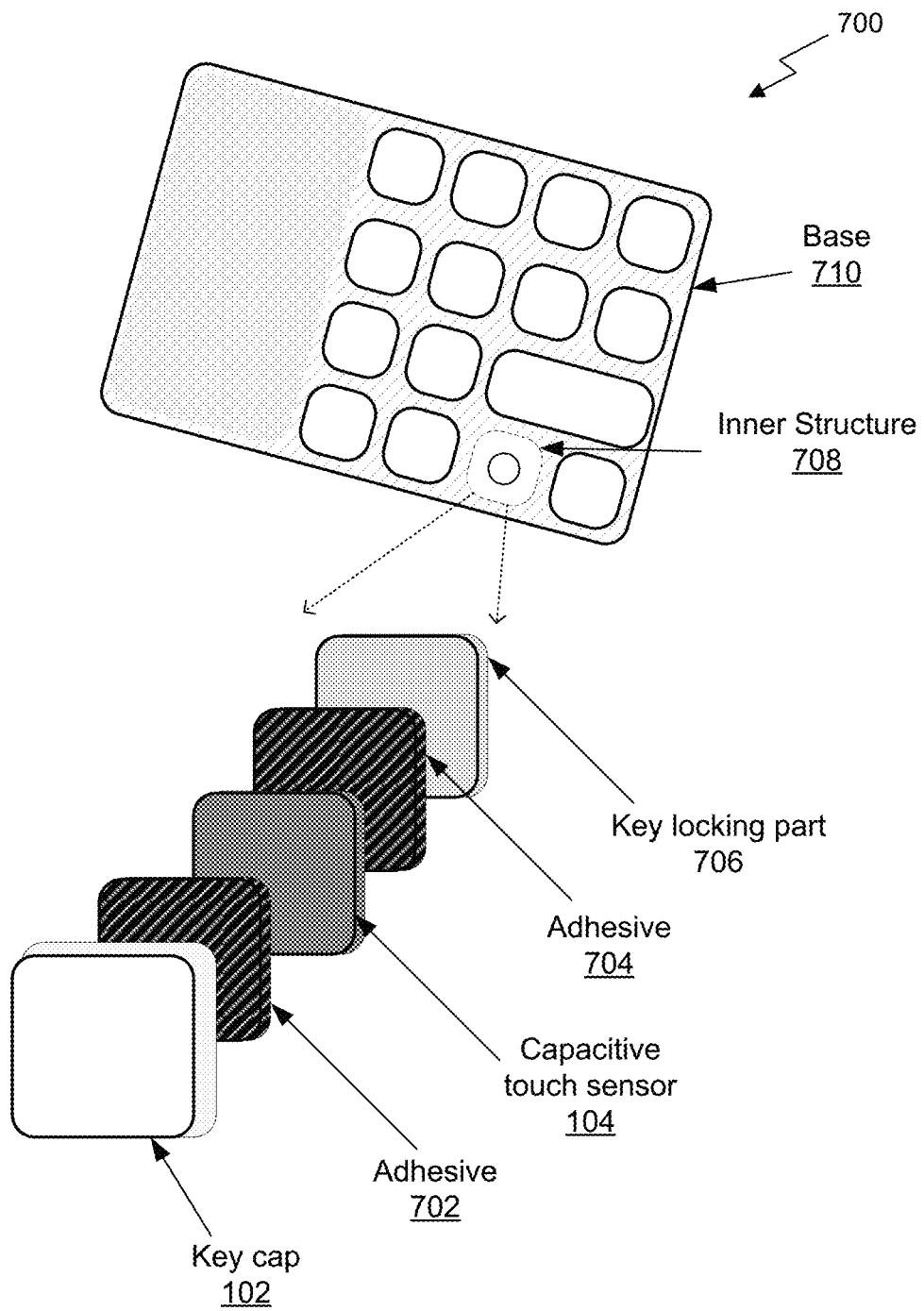
FIG. 7A illustrates an exploded view of a portion of a mechanical keyboard with a capacitive touch enabled mechanical key having a corresponding tactile button, in accordance with an embodiment.

FIG. 7A illustrates an exploded view of a portion of a mechanical keyboard 700 with a capacitive touch enabled mechanical key having a corresponding tactile button, in accordance with an embodiment. The present embodiment may be implemented, for example, in the context of any of the figures mentioned above.

The mechanical keyboard 700 includes a base 710 that is coupled to a mechanical key. The mechanical key includes all of the components shown, including the key cap 102 and capacitive touch sensor 104 coupled to the key cap 102 via a first adhesive layer 702. The side of the capacitive touch sensor 104 opposite the key cap 102 is further coupled to a key locking part 706 via a second adhesive layer 704. The key locking part 706 may include interlocking structure 502 and scissors mechanism 504 of FIG. 5, or any other component configured to attach the mechanical key to the base 710 of the mechanical keyboard 700. The mechanical key further includes an inner structure 708 which includes a tactile button (e.g. metal dome or other material) similar to other mechanical keys of the mechanical keyboard 700.

Figure 7B:
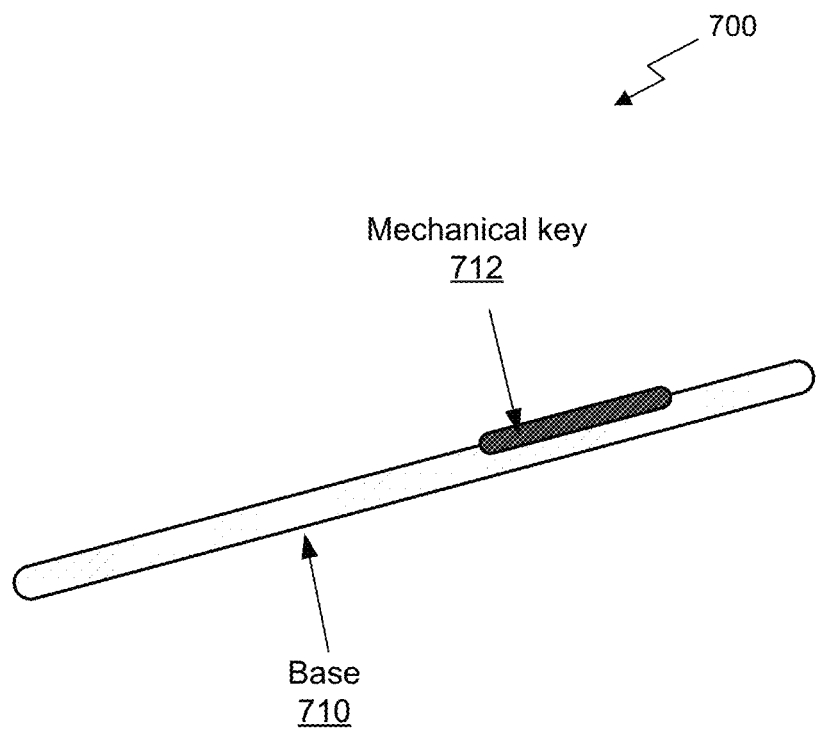
FIG. 7B illustrates a connected view of the portion of the mechanical keyboard of FIG. 7A, in accordance with an embodiment.

FIG. 7B illustrates a connected view of the portion of the mechanical keyboard 700 of FIG. 7A, in accordance with an embodiment. The present embodiment shows the stacked layers of the mechanical key 712 without the key cap. As shown, when the mechanical key 712 is attached to the base 710 of the mechanical keyboard 700, a structure bump may result from the stacked components of the mechanical key 712, namely where the structure bump is at a height higher than structures used for other mechanical keys of the mechanical keyboard 700 that do not provide capacitive touch sensing. Thus, this structure bump may be caused by the additional components added to the mechanical key 712 to enable the mechanical key 712 to provide capacitive touch sensing. To address this structure bump, the key cap for the mechanical key 712 may be made thinner than the key caps for the other mechanical keys in order to compensate for the added height, and thus to make the mechanical key 712a same height as the other mechanical keys.

Figure 8:
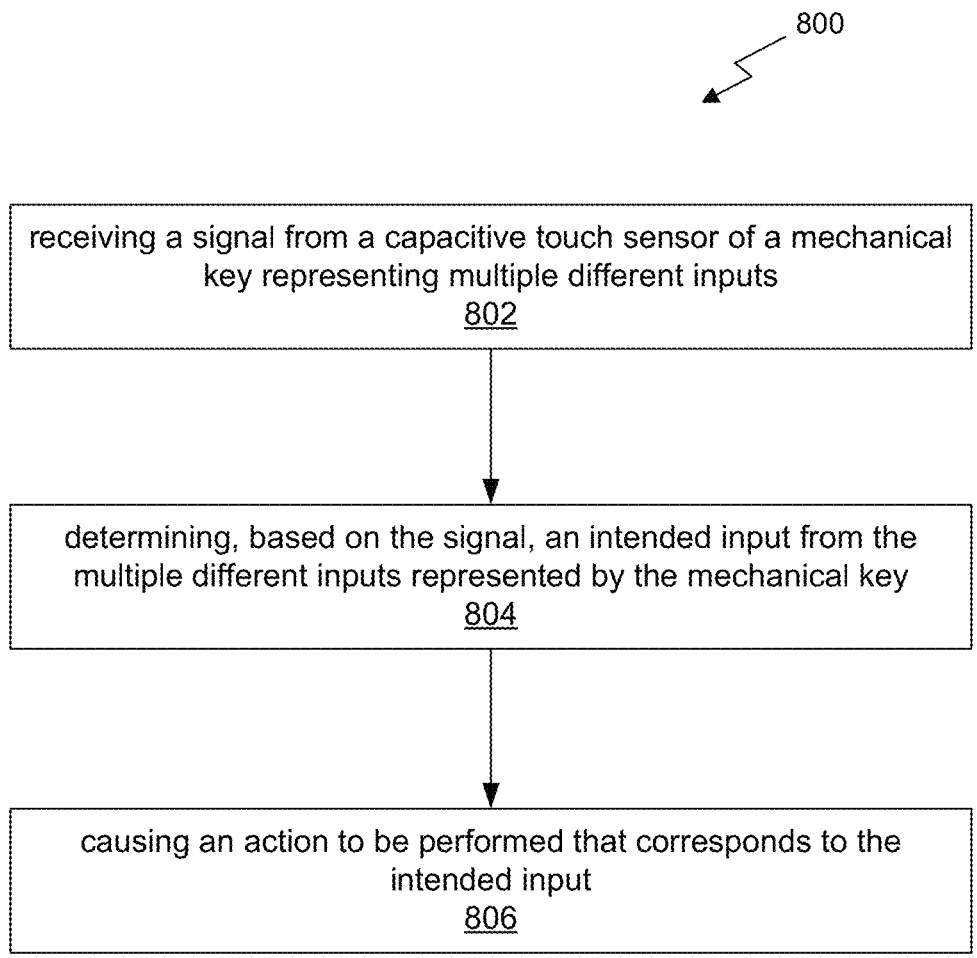
FIG. 8 illustrates a flowchart of a method associated with use of the mechanical key of FIG. 1, in accordance with an embodiment.

FIG. 8 illustrates a flowchart of a method 800 associated with use of the mechanical key 100 of FIG. 1, in accordance with an embodiment. The method 800 may be performed by a processor or other computing device coupled to the input device having the mechanical key 100.

As shown in operation 802, a signal is received from a capacitive touch sensor of a mechanical key representing multiple different inputs. For example, different portions of the mechanical key may correspond to the multiple different inputs (e.g. each portion corresponding to one of the inputs). In one exemplary embodiment, a top portion of the mechanical key may represent an up arrow input and a bottom portion of the mechanical key may represent a down arrow input. With respect to this exemplary embodiment, the up and down arrows may correspond to a corresponding command, such as a display scroll up or down, respectively, or cursor movement when used with a computer controlled display.

Optionally, the signal may be received when the mechanical key is depressed by a user. For example, a switch or other circuitry may transmit the signal from the capacitive touch sensor when the mechanical key is depressed by a user.

In an embodiment, the capacitive touch sensor may sense one of the different portions touched by a user such that the signal received from the capacitive touch sensor indicates the one of the different portions touched by the user. To this end, the mechanical key may operate such that, responsive to the press (depression) of the mechanical key by the user, the capacitive touch sensor generates a signal indicative of the user's touch.

Additionally, in operation 804, an intended input from the multiple different inputs represented by the mechanical key is determined, based on the signal. In an embodiment where the signal indicates the one of the different portions of the mechanical key touched by the user, the intended input may be determined as one of the multiple different inputs that corresponds to the one of the different portions of the mechanical key touched by the user. To this end, the capacitive touch sensor may be capable of outputting different signals for the multiple different inputs.

In the exemplary embodiment above where the top portion of the mechanical key represents the up arrow input and the bottom portion of the mechanical key represents the down arrow input, the intended input may be determined to be either the up arrow input or the down arrow input, depending on the portion of the mechanical key touched by the user.

Further, in operation 806, an action that corresponds to the intended input is caused to be performed. For example, a command may be sent to a processor to perform the action. In the exemplary embodiment where the intended input is determined to be the up arrow input, the action may be an up action, or where the intended input is determined to be the down arrow input, the action may be a down action. In any case, the action may be predefined for the one of the multiple different inputs that is determined to be the intended input.

What is claimed is:

1. A mechanical key for an input device, comprising:
 a key cap having a capacitive touch sensor coupled thereto;
 a key locking part coupled to an underside of the capacitive touch sensor, wherein the key locking part includes:
  an interlocking structure, and
  a scissors mechanism or a seesaw mechanism;
 a tactile button situated under the key locking part to register a press of the key cap by a user;
 wherein the key locking part is configured to attach the mechanical key to a base structure of a mechanical keyboard.

2. The mechanical key of claim 1, wherein the mechanical key is configured to differentiate between a plurality of different inputs.

3. The mechanical key of claim 2, wherein, responsive to the press of the key cap by the user, the capacitive touch sensor is operable to determine an intended input of the plurality of different inputs.

4. The mechanical key of claim 3, wherein the capacitive touch sensor is a hardware device that detects touch of the key cap by the user.

5. The mechanical key of claim 4, wherein the capacitive touch sensor includes a sensor electrode that is connected to a measurement circuit where capacitance of the sensor electrode is measured.

6. The mechanical key of claim 5, wherein the capacitance increases when the user touches the sensor electrode.

7. The mechanical key of claim 6, wherein the measurement circuit detects a change in the capacitance and converts the change into a signal.

8. The mechanical key of claim 7, wherein the signal is sent to a processing unit to determine the intended input.

9. The mechanical key of claim 2, wherein the plurality of different inputs include at least two of an up arrow input, a down arrow input, a left arrow input, and a right arrow input.

10. The mechanical key of claim 1, wherein the capacitive touch sensor is coupled to the key cap using an adhesive layer therebetween.

11. An input device, comprising:
 a base of a mechanical keyboard; and
 at least one mechanical key electrically and mechanically connected to the base, the at least one mechanical key including:
  a key cap having a capacitive touch sensor coupled thereto,
  a key locking part coupled to an underside of the capacitive touch sensor, wherein the key locking part includes:
   an interlocking structure, and
   a scissors mechanism or a seesaw mechanism,
  a tactile button situated under the key locking part to register a press of the key cap by a user,
  wherein the key locking part is configured to attach the mechanical key to the base of the mechanical keyboard.

12. The input device of claim 11, wherein the tactile button provides a same tactile response as at least one second mechanical key of the input device representing a single input.

13. The input device of claim 11, wherein the mechanical key is configured to differentiate between a plurality of different inputs.

14. The input device of claim 12, wherein, responsive to the press of the key cap by the user, the capacitive touch sensor operable to determine an intended input of the plurality of different inputs.

15. The input device of claim 14, wherein the capacitive touch sensor is a hardware device that detects touch of the key cap by the user.

16. The input device of claim 15, wherein the capacitive touch sensor includes a sensor electrode that is connected to a measurement circuit where capacitance of the sensor electrode is measured.

17. The input device of claim 16, wherein the capacitance increases when the user touches the sensor electrode.

18. The input device of claim 17, wherein the measurement circuit detects a change in the capacitance and converts the change into a signal.

19. The input device of claim 18, wherein the signal is sent to a processing unit to determine the intended input.

20. The input device of claim 11, wherein the plurality of different inputs include at least two of an up arrow input, a down arrow input, a left arrow input, and a right arrow input.

21. The input device of claim 11, wherein the capacitive touch sensor is coupled to the key cap using an adhesive layer therebetween.

* * * * *